US012728866B2

(12) United States Patent
Allard et al.

(10) Patent No.: US 12,728,866 B2
(45) Date of Patent: Sep. 8, 2026

(54) VEHICLE POWERTRAIN TORQUE LIMITATION BASED ON ACCELERATOR PEDAL AND BRAKE PRESSURE

(71) Applicant: FCA US LLC, Auburn Hills, MI (US)

(72) Inventors: Corey Allard, Auburn Hills, MI (US); Joshua Rohrer, Auburn Hills, MI (US)

(73) Assignee: FCA US LLC, Auburn Hills, MI (US)

(*) Notice: Subject to any disclaimer, the term of this patent is extended or adjusted under 35 U.S.C. 154(b) by 29 days.

(21) Appl. No.: 18/808,554

(22) Filed: Aug. 19, 2024

(65) Prior Publication Data

US 2025/0083659 A1 Mar. 13, 2025

Related U.S. Application Data

(60) Provisional application No. 63/581,139, filed on Sep. 7, 2023.

(51) Int. Cl.

*B60W 30/18* (2012.01)
*B60W 20/15* (2016.01)
*B60W 30/184* (2012.01)

(52) U.S. Cl.

CPC .......... *B60W 30/184* (2013.01); *B60W 20/15* (2016.01); *B60W 30/18027* (2013.01);

(Continued)

(58) Field of Classification Search

CPC ...... B60W 20/15; B60W 10/06; B60W 10/08; B60W 30/184; B60W 50/10;

(Continued)

(56) References Cited

U.S. PATENT DOCUMENTS 7,024,290 B2 * 4/2006 Zhao .................... B60W 30/20 701/91
7,894,968 B2 * 2/2011 Stroh ................. B60W 10/184 701/84

(Continued)

FOREIGN PATENT DOCUMENTS

CN 115703453 A * 2/2023 ............ B60W 10/08
IN 297KO2008 A * 4/2009
WO 2012096612 A1 7/2012

OTHER PUBLICATIONS

Hong, Jinlong et al. “Engine Speed Regulation During Gear Shift Process of Torque Decoupled HEV Using Triple-Step Nonlinear Method.” International journal of automotive technology 22.2 (2021): 415-428. Web. (Year: 2021).*

*Primary Examiner* — Erin D Bishop
*Assistant Examiner* — Keith A von Volkenburg
(74) *Attorney, Agent, or Firm* — Jeremy J. Klobucar

(57) ABSTRACT

A launch control system for a vehicle includes a control system configured to, in response to detecting a launch control request, determine whether an accelerator pedal position and a brake pressure are greater than respective calibrated thresholds, when the accelerator pedal position and the brake pressure are both greater than the respective calibrated thresholds, temporarily limit a torque output of a torque generating system to a limited calibrated value to mitigate or prevent potential damage to a driveline system, and while temporarily limiting the torque output of the torque generating system to the limited calibrated value, when at least one of the accelerator pedal position and the brake pressure falls below its respective calibrated threshold, increase the torque output of the torque generating system to a maximum calibrated value.

17 Claims, 2 Drawing Sheets

(52) U.S. Cl.
CPC ..... *B60W 2540/10* (2013.01); *B60W 2540/12* (2013.01); *B60W 2710/0666* (2013.01)

(58) Field of Classification Search
CPC ....... B60W 30/18027; B60W 2540/10; B60W 2540/12; B60W 2710/0666; B60W 2710/083
USPC ........................................................... 701/22
See application file for complete search history.

(56) References Cited

U.S. PATENT DOCUMENTS

| | | | | |
|---|---|---|---|---|
| 7,909,732 | B2 | 3/2011 | Sigmund | |
| 11,351,855 | B2 | 6/2022 | Gambhira | |
| 2014/0257609 | A1* | 9/2014 | Dufford | B60W 50/082 180/65.265 |
| 2017/0096142 | A1* | 4/2017 | Kim | B60W 10/06 |
| 2018/0354493 | A1* | 12/2018 | Johri | B60W 20/19 |
| 2019/0263385 | A1* | 8/2019 | Zhou | B60K 6/52 |
| 2021/0078577 | A1 | 3/2021 | Roques | |
| 2023/0303061 | A1* | 9/2023 | DeWalt | B60W 20/19 |

* cited by examiner

VEHICLE POWERTRAIN TORQUE LIMITATION BASED ON ACCELERATOR PEDAL AND BRAKE PRESSURE

CROSS-REFERENCE TO RELATED APPLICATION(S)

The present application claims the benefit of U.S. Provisional Application No. 63/581,139, filed on Sep. 7, 2023. The disclosure of this application is incorporated herein by reference in its entirety.

FIELD

The present application generally relates to vehicle torque control and, more particularly, to techniques for vehicle powertrain torque limitation based on accelerator pedal position and brake pressure.

BACKGROUND

Vehicles are propulsively powered by powertrains that include a torque generating system (e.g., an engine, electric motor(s), or combinations thereof) and a transmission system (a multi-speed automatic transmission, a torque converter, etc.) that transfers torque to a driveline system (drive/half shafts 114*b*, differentials 114*a*, etc.). Conventional vehicle torque control systems reduce or limit powertrain torque based on criteria such as a torque converter speed and a transmission gear ratio. In a high-performance vehicle, it could be desirable to not limit powertrain torque based on torque converter speed in order to provide maximized performance (e.g., fast vehicle launches). In some cases, however, this could potentially result in damage to driveline components (e.g., damaged or broken drive/half shafts) when the driver is simultaneously applying both the brake and accelerator pedals. Accordingly, while such conventional vehicle torque control systems do work well for their intended purpose, there exists an opportunity for improvement in the relevant art.

SUMMARY

According to one example aspect of the invention, a launch control system for a vehicle having a torque generating system connected to a driveline system via an automatic transmission is presented. In one exemplary implementation, the launch control system comprises a set of sensors configured to monitor (i) a position of an accelerator pedal of the vehicle and (ii) a brake pressure commanded by a brake pedal of the vehicle and a control system configured to, in response to detecting a launch control request, determine whether the accelerator pedal position and the brake pressure are greater than respective calibrated thresholds, when the accelerator pedal position and the brake pressure are both greater than the respective calibrated thresholds, temporarily limit a torque output of the torque generating system to a limited calibrated value to mitigate or prevent potential damage to the driveline system, and while temporarily limiting the torque output of the torque generating system to the limited calibrated value, when at least one of the accelerator pedal position and the brake pressure falls below its respective calibrated threshold, increase the torque output of the torque generating system to a maximum calibrated value.

In some implementations, the maximum calibrated value for the torque output of the torque generating system is not based on a speed ratio of a torque converter arranged between the torque generating system and the automatic transmission. In some implementations, the control system is configured to increase the torque output of the torque generating system from the limited calibrated value to the maximum calibrated value in a step manner.

In some implementations, the controller is further configured to, while temporarily limiting the torque output of the torque generating system to the limited calibrated value, increase the torque output of the torque generating system to the maximum calibrated value when a gradient or rate of change of the brake pressure falls below a respective calibrated threshold.

In some implementations, the potential damage to the driveline system is physical damage to a driveshaft or half-shaft of the driveline system. In some implementations, the physical damage to the driveshaft or half-shaft is a crack or a full break of the driveshaft or half-shaft. In some implementations, the potential damage to the driveline system is physical damage to a differential of the driveline system. In some implementations, the launch control request includes the vehicle being stopped and a driver launch control request being received from a driver of the vehicle via a driver interface.

In some implementations, the torque generating system comprises at least one of an internal combustion engine and an electric traction motor. In some implementations, the torque generating system comprises the internal combustion engine and at least one electric traction motor.

According to another example aspect of the invention, a launch control method for a vehicle having a torque generating system connected to a driveline system via an automatic transmission is presented. In one exemplary implementation, the launch control method comprises monitoring, by a control system of the vehicle and using a set of sensors of the vehicle, (i) a position of an accelerator pedal of the vehicle and (ii) a brake pressure commanded by a brake pedal of the vehicle and, in response to detecting, by the control system, a launch control request, determining, by the control system, whether the accelerator pedal position and the brake pressure are greater than respective calibrated thresholds, when the accelerator pedal position and the brake pressure are both greater than the respective calibrated thresholds, temporarily limiting, by the control system, a torque output of the torque generating system to a limited calibrated value to mitigate or prevent potential damage to the driveline system, and while temporarily limiting the torque output of the torque generating system to the limited calibrated value, when at least one of the accelerator pedal position and the brake pressure falls below its respective calibrated threshold, increasing, by the control system, the torque output of the torque generating system to a maximum calibrated value.

In some implementations, the maximum calibrated value for the torque output of the torque generating system is not based on a speed ratio of a torque converter arranged between the torque generating system and the automatic transmission. In some implementations, the increasing of the torque output of the torque generating system from the limited calibrated value to the maximum calibrated value is performed in a step manner.

In some implementations, the launch control method further comprises, while temporarily limiting the torque output of the torque generating system to the limited calibrated value, increasing, by the control system, the torque output of the torque generating system to the maximum calibrated value when a gradient or rate of change of the brake pressure falls below a respective calibrated threshold.

In some implementations, the potential damage to the driveline system is physical damage to a driveshaft or half-shaft of the driveline system. In some implementations, the physical damage to the driveshaft or half-shaft is a crack or a full break of the driveshaft or half-shaft.

In some implementations, the potential damage to the driveline system is physical damage to a differential of the driveline system. In some implementations, the launch control request includes the vehicle being stopped and a driver launch control request being received from a driver of the vehicle via a driver interface.

In some implementations, the torque generating system comprises at least one of an internal combustion engine and an electric traction motor. In some implementations, the torque generating system comprises the internal combustion engine and at least one electric traction motor.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, in high-performance vehicles, it could be desirable to not limit engine torque based on torque converter speed in order to provide maximized performance (e.g., fast vehicle launches). In some cases, however, this could result in damage to driveline components (e.g., damaged or broken drive/half shafts) when the driver is simultaneously applying both the brake and accelerator pedals. For example, snapped or damaged drive/half shafts could occur when a large amount of brake pressure followed immediately by (or simultaneously with) wide-open throttle (WOT) acceleration.

As a result, improved techniques that detect a specific set of entry and exit conditions for limiting engine torque to prevent or mitigate the possibility of the above-described driveline component damage are presented herein. The input criteria includes brake pressure and accelerator pedal position. When these input criteria exceeds respective calibrated thresholds, torque limitation is enabled to protect the vehicle driveline components. When any of the entry criteria/conditions are no longer satisfied, the torque limitation exits back to non-limited torque control. This could include, for example, a step increase back to the maximum calibrated value without regard to the torque converter speed ratio.

Figure 1:
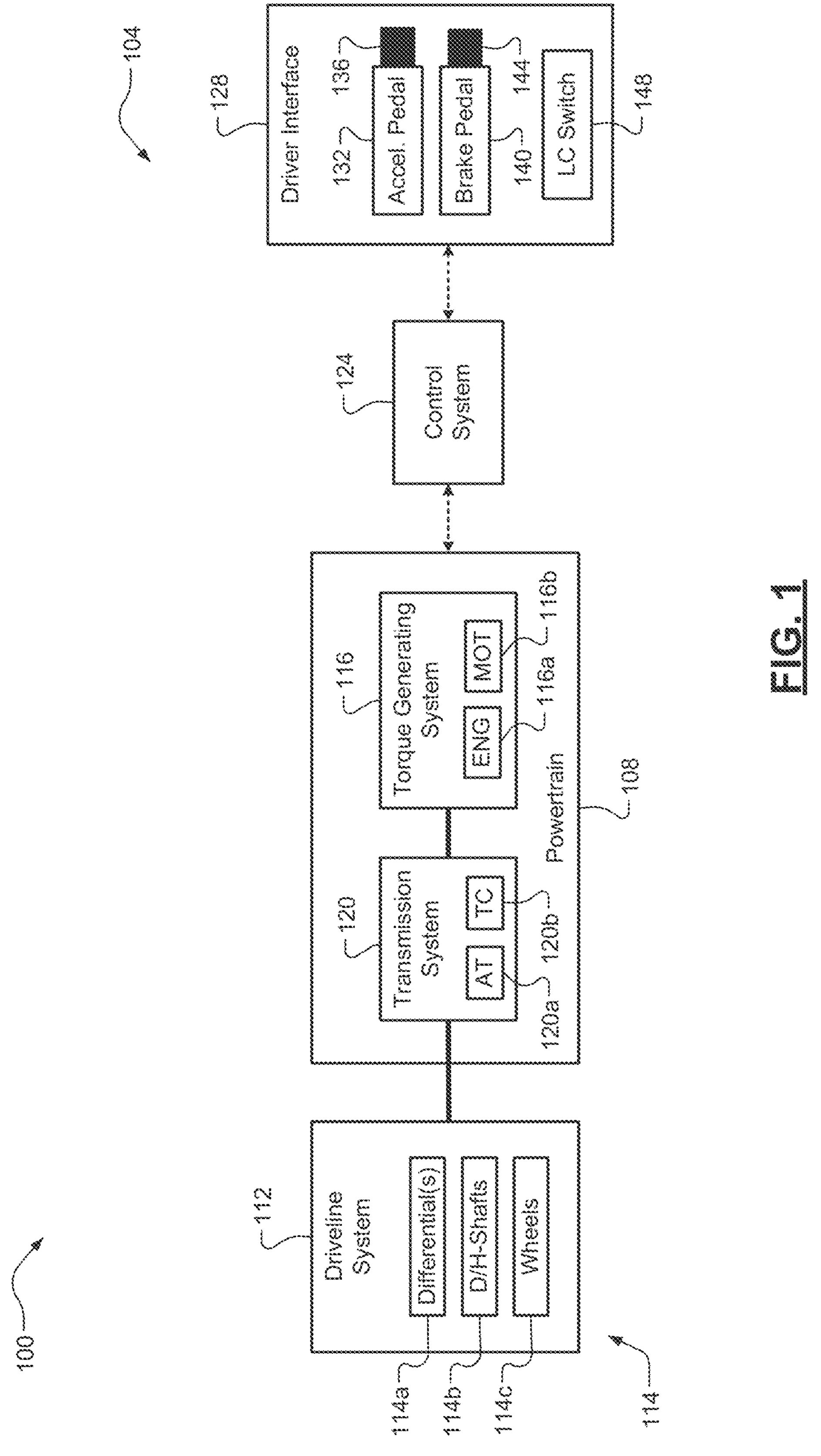
FIG. 1 is a functional block diagram of a high-performance vehicle having an example launch control system according to the principles of the present application.

Referring now to FIG. 1, a functional block diagram of a high-performance vehicle 100 (also referred to as "vehicle 100") having an example torque or launch control system 104 according to the principles of the present application is illustrated. The vehicle 100 generally includes a powertrain 108 that generates and transfers torque to a driveline system 112 for vehicle propulsion. The powertrain 108 includes a torque generating system 116 and a transmission system 120. The torque generating system 116 includes an internal combustion engine (ENG) **116*a* configured to combust a mixture of air and fuel (gasoline, diesel, etc.) to generate torque, one or more electric traction motors (MOT) 116*b* powered by a high-voltage battery system (not shown) to generate torque, or a combination thereof. In other words, the vehicle 100 could be a conventional/engine-only vehicle, a hybrid electric vehicle (HEV), or an all-electric vehicle (e.g., a battery electric vehicle, or BEV). For example only, the torque generating system 116** could include a high-output internal combustion engine in combination with one or more electric motors configured to provide additional torque (e.g., all-wheel drive launch torque) in specific situations (e.g., vehicle launches).

As the vehicle 100 is a high-performance vehicle, the torque generating system 116 is capable of generating a large amount of drive torque, such as for fast vehicle launches and quarter-mile race times. The transmission system 120 includes a fluid coupling or torque converter (TC) **120*b* and a multi-speed automatic transmission (AT) 120*a* comprising a plurality of gears/gear ratios and clutches and configured to multiply and transfer the torque from the torque generating system 116 to the driveline system 112. The driveline system 112 includes a plurality of driveline components 114 such as, but not limited to, differentials 114*a*, driveshafts or axles/half-shafts 114*b*, wheels 114*c***, and the like.

A controller or control system 124 controls operation of the vehicle 100, including primarily controlling the powertrain 108 to generate and transfer torque to the driveline system 112 to satisfy a driver torque request. The driver torque request is provided by a driver of the vehicle 100 via a driver interface 128, which includes, but is not limited to, an accelerator pedal 132 (with a corresponding accelerator pedal position sensor 136) and a brake pedal 140 (with a corresponding brake pedal position or brake pressure sensor 144). The driver interface 128 also includes a launch control (LC) switch 148 configured for the driver to provide/input a vehicle launch control request (e.g., when the vehicle 100 is stopped). The driver interface 128 could also include other non-illustrated input/output devices (e.g., a touch display) that are configured such that the driver is able to customize launch/performance parameters of the vehicle 100 and enable/initiate a launch control mode.

The control system 124 is generally configured to control the powertrain 108 (the torque generating system 116) such that the maximum torque generated by torque generating system 116 is not limited based on the speed or speed ratio of the torque converter **120*b*. The control system 124 is also configured to monitor input criteria, such as the accelerator pedal position and brake pressure, to determine entry and exit to torque-limited control/operation of the powertrain 108 (the torque generating system 116). This torque-limited control of the powertrain 108 includes reducing or limiting the maximum torque generated by the torque generating system 116 to a specific (e.g., calibrated) level designed to prevent or mitigate potential damage to components of the driveline system 112 (e.g., drive/half-shafts 114*b*). Each of the "calibrated" values/thresholds discussed herein represent parameters that are calibrated for a particular vehicle application (e.g., powertrain configuration) and thus could differ or vary from vehicle to vehicle. In one exemplary implementation, at least a portion of the torque control techniques of the present application are implemented in a transmission control module (TCM) that is specifically configured to control the transmission system 120 (i.e., automatic transmission 120***a*), including varying/limiting a torque request for the torque generating system 116 to achieve.

Figure 2:
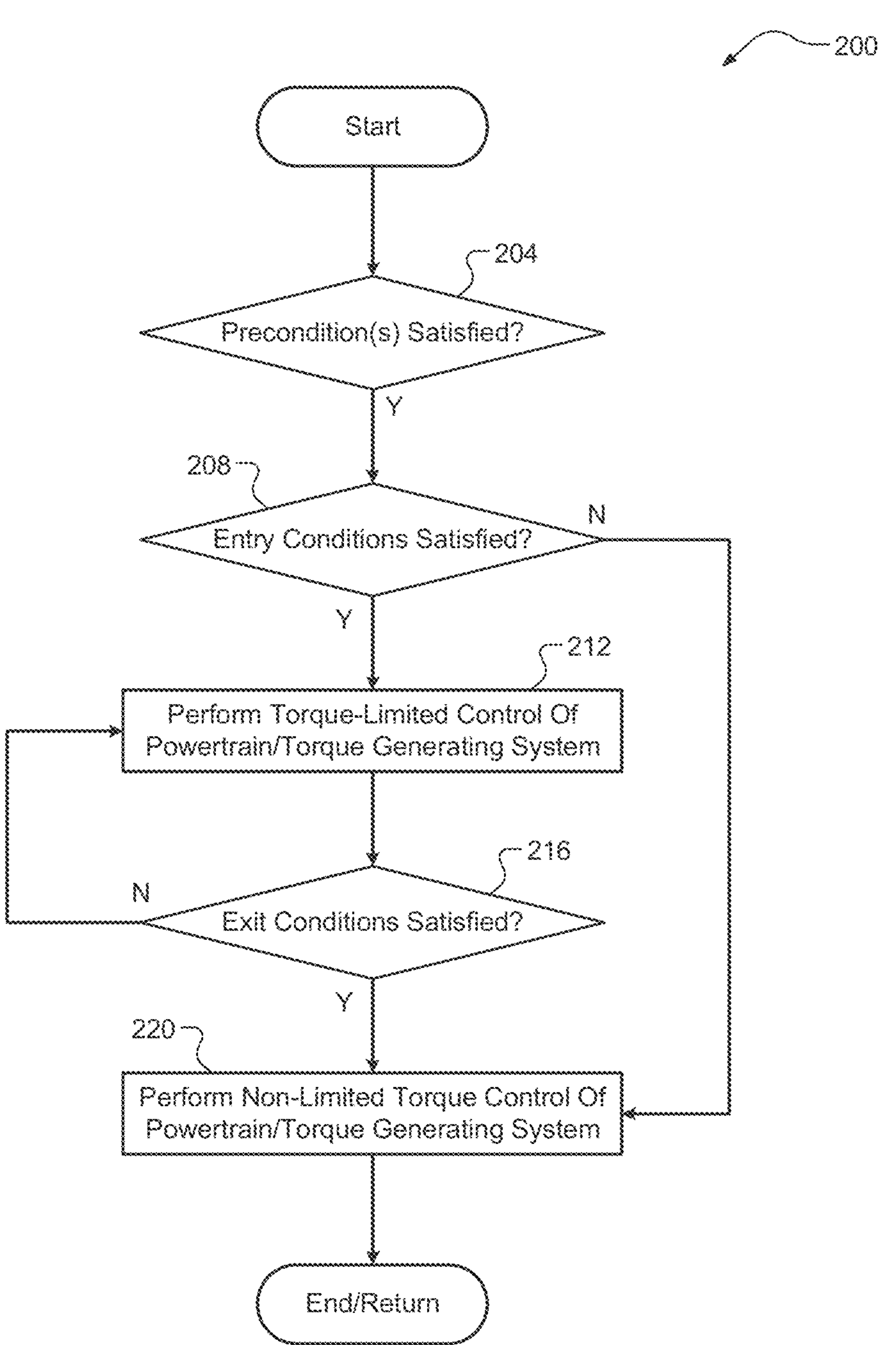
FIG. 2 is a flow diagram of an example vehicle launch control method for limiting powertrain torque based on brake pressure and accelerator pedal position according to the principles of the present application.

Referring now to FIG. 2, a flow diagram of a vehicle torque control method 200 for limiting powertrain torque based on brake pressure and accelerator pedal position according to the principles of the present application is illustrated. While the components of vehicle 100 are specifically referenced for illustrative/descriptive purposes, it will be appreciated that the method 200 could be applicable to any suitably-configured vehicle. At optional 204, the control system 124 determines whether a set of one or more preconditions are satisfied. This could include, for example only, the torque generating system 116 being powered up and running and there being no malfunctions present that would otherwise inhibit or prevent operation of the techniques of the present application (e.g., a torque-limited limp-home mode being activated due to a malfunction). When true, the method 200 continues to 208. Otherwise, the method 200 ends or returns to 204.

At 208, the control system 124 determines whether the entry conditions/criteria for torque-limited control of the powertrain 108 are satisfied. This includes accelerator pedal position (measured by sensor 136) and brake pressure (measured by sensor 144) exceeding respective calibratable thresholds. This could also include the vehicle launch control request having been provided by the driver via the LC switch 148 or another suitable component of the driver interface 128 (e.g., a touch display). It will also be appreciated that the launch or torque control techniques of the present application could be enabled or utilized when the vehicle is not fully stopped, such as during a rolling launch event. When false, the method 200 proceeds to 220 (for normal, non-limited torque control, as described more fully below). When true, the method 200 continues to 212 where the control system 124 controls the powertrain 108 (the torque generating system 116) such that its maximum torque output is limited or capped.

At 216, the control system 124 determines whether the exit conditions/criteria from the torque-limited control of the powertrain 108 are satisfied. This includes accelerator pedal position (measured by sensor 136) or brake pressure (measured by sensor 144) falling below the respective calibratable thresholds. It will be appreciated that slightly different calibratable thresholds could also be used for entry and exit conditions, and that hysteresis could be optionally applied, in order to prevent excessively entering/exiting the torque-limited control of the powertrain 108. In one exemplary implementation, the exit condition includes a gradient or rate of change of the brake pressure falling below another respective calibratable threshold. When 216 is false, the method 200 returns to 212. When true, the method 200 continues to 220 where the control system 124 resumes normal control (non-limited torque control) of the powertrain 108 (the torque generating system 116). This could include, for example, a single stepping of the maximum torque output of the torque generating system 116 back up to its maximum value, or some other suitable type of transition (e.g., a multi-stepped or other step manner transition, or a gradual/rate-controlled transition). The method 200 then ends or returns to 204 for one or more additional cycles.

To summarize, in a high-performance vehicle application, if a customer applies a large amount of brake pressure and then applies the accelerator pedal to WOT, there is a chance to damage the driveline components downstream of the transmission. Previously, engine torque would be reduced based on torque converter speed ratio and gear only. When limiting engine torque, however, there is a significant impact on customer launch performance due to the torque converter speed ratio as well as gear ratio as there is a period until the torque converter couples where the customer will not be receiving full engine power.

This invention involves the torque limitation logic in an automatic transmission. The implemented controls affect the transmission torque limitation. The logic includes controls to reduce the transmission input torque limit based on accelerator pedal and brake pressure to aid in driveline hardware protection, while maintaining maximum performance during a vehicle launch situation.

This solution involves detecting a specific set of maneuvers based on a set of input criteria (brake pressure and accelerator pedal) that would indicate that the customer may be in position where driveline hardware damage can occur. Once these maneuvers are detected the software will switch to a set of calibration labels specifically used to ensure that the input torque is controlled to a satisfactory level. When any of the entry criteria is no longer met the input torque limit will be increased in a step to the maximum calibrated value that is not based on or is without respect to a speed ratio of a torque converter arranged between the torque generating system and the automatic transmission.

This solution is different than previous solutions as it will allow the transmission to limit torque to the driveline when the brake pressure and driver requested torque (accelerator pedal) is at a level that driveline damage can occur, while allowing full engine torque as soon as the driver launches the vehicle or reduces the brake pressure to a predefined value that will allow the wheels to spin. Traditionally these torque limit situations would compromise all driving situations, but with this solution the driver would receive maximum performance while preventing driveline damage.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A launch control system for a vehicle having a torque generating system connected to a driveline system via an automatic transmission, the launch control system comprising:

a set of sensors configured to monitor (i) a position of an accelerator pedal of the vehicle and (ii) a brake pressure commanded by a brake pedal of the vehicle; and a control system configured to, in response to detecting a launch control request:

determine whether the accelerator pedal position and the brake pressure are greater than respective calibrated thresholds;

when the accelerator pedal position and the brake pressure are both greater than the respective calibrated thresholds, temporarily limit a torque output of the torque generating system to a limited calibrated value to mitigate or prevent potential damage to the driveline system, wherein the potential damage to the driveline system is physical damage to (i) a driveshaft or half-shaft of the driveline system or (ii) a differential of the driveline system; and while temporarily limiting the torque output of the torque generating system to the limited calibrated value, when at least one of the accelerator pedal position and the brake pressure falls below its respective calibrated threshold, increase the torque output of the torque generating system to a maximum calibrated value.

2. The launch control system of claim 1, wherein the maximum calibrated value for the torque output of the torque generating system is not based on a speed ratio of a torque converter arranged between the torque generating system and the automatic transmission.

3. The launch control system of claim 2, wherein the control system is configured to increase the torque output of the torque generating system from the limited calibrated value to the maximum calibrated value in a step manner.

4. The launch control system of claim 1, wherein the controller is further configured to, while temporarily limiting the torque output of the torque generating system to the limited calibrated value, increase the torque output of the torque generating system to the maximum calibrated value when a gradient or rate of change of the brake pressure falls below a respective calibrated threshold.

5. The launch control system of claim 1, wherein the physical damage to the driveshaft or half-shaft is a crack or a full break of the driveshaft or half-shaft.

6. The launch control system of claim 1, wherein the launch control request includes the vehicle being stopped and a driver launch control request being received from a driver of the vehicle via a driver interface.

7. The launch control system of claim 1, wherein the torque generating system comprises at least one of an internal combustion engine and an electric traction motor.

8. The launch control system of claim 7, wherein the torque generating system comprises the internal combustion engine and at least one electric traction motor.

9. A launch control method for a vehicle having a torque generating system connected to a driveline system via an automatic transmission, the launch control method comprising:

monitoring, by a control system of the vehicle and using a set of sensors of the vehicle, (i) a position of an accelerator pedal of the vehicle and (ii) a brake pressure commanded by a brake pedal of the vehicle; and in response to detecting, by the control system, a launch control request:

determining, by the control system, whether the accelerator pedal position and the brake pressure are greater than respective calibrated thresholds;

when the accelerator pedal position and the brake pressure are both greater than the respective calibrated thresholds, temporarily limiting, by the control system, a torque output of the torque generating system to a limited calibrated value to mitigate or prevent potential damage to the driveline system, wherein the potential damage to the driveline system is physical damage to (i) a driveshaft or half-shaft of the driveline system or (ii) a differential of the driveline system; and while temporarily limiting the torque output of the torque generating system to the limited calibrated value, when at least one of the accelerator pedal position and the brake pressure falls below its respective calibrated threshold, increasing, by the control system, the torque output of the torque generating system to a maximum calibrated value.

10. The launch control method of claim 9, wherein the maximum calibrated value for the torque output of the torque generating system is not based on a speed ratio of a torque converter arranged between the torque generating system and the automatic transmission.

11. The launch control method of claim 10, wherein the increasing of the torque output of the torque generating system from the limited calibrated value to the maximum calibrated value is performed in a step manner.

12. The launch control method of claim 9, further comprising, while temporarily limiting the torque output of the torque generating system to the limited calibrated value, increasing, by the control system, the torque output of the torque generating system to the maximum calibrated value when a gradient or rate of change of the brake pressure falls below a respective calibrated threshold.

13. The launch control method of claim 9, wherein the physical damage to the driveshaft or half-shaft is a crack or a full break of the driveshaft or half-shaft.

14. The launch control method of claim 9, wherein the launch control request includes the vehicle being stopped and a driver launch control request being received from a driver of the vehicle via a driver interface.

15. The launch control method of claim 9, wherein the torque generating system comprises at least one of an internal combustion engine and an electric traction motor.

16. The launch control method of claim 15, wherein the torque generating system comprises the internal combustion engine and at least one electric traction motor.

17. A launch control method for a vehicle having a torque generating system connected to a driveline system via an automatic transmission, the launch control method comprising:

monitoring, by a control system of the vehicle and using a set of sensors of the vehicle, (i) a position of an accelerator pedal of the vehicle and (ii) a brake pressure commanded by a brake pedal of the vehicle; and in response to detecting, by the control system, a launch control request:

determining, by the control system, whether the accelerator pedal position and the brake pressure are greater than respective calibrated thresholds;

when the accelerator pedal position and the brake pressure are both greater than the respective calibrated thresholds, temporarily limiting, by the control system, a torque output of the torque generating system to a limited calibrated value to mitigate or prevent potential damage to the driveline system; and while temporarily limiting the torque output of the torque generating system to the limited calibrated value, when at least one of the accelerator pedal position and the brake pressure falls below its respective calibrated threshold, increasing, by the control system, the torque output of the torque generating system to a maximum calibrated value, wherein one of:

(i) the maximum calibrated value for the torque output of the torque generating system is not based on a speed ratio of a torque converter arranged between the torque generating system and the automatic transmission, and the increasing of the torque output of the torque generating system from the limited calibrated value to the maximum calibrated value is performed in a step manner; and (ii) the launch control method further comprises, while temporarily limiting the torque output of the torque generating system to the limited calibrated value, increasing, by the control system, the torque output of the torque generating system to the maximum calibrated value when a gradient or rate of change of the brake pressure falls below a respective calibrated threshold.

* * * * *